US012706539B2

(12) United States Patent
Dhagat et al.

(10) Patent No.: US 12,706,539 B2
(45) Date of Patent: Aug. 11, 2026

(54) FEEDBACK BASED ZERO CURRENT DETECTION CIRCUIT AND SYNCHRONOUS BOOST CONVERTER INCLUDING THE SAME

(71) Applicant: Samsung Electronics Co., Ltd., Suwon-si (KR)

(72) Inventors: Mihir Dhagat, Bengaluru (IN); Ranjith KT, Bengaluru (IN); Ravindra Kumar Singh, Bengaluru (IN); Subodh Prakash Taigor, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 18/609,054

(22) Filed: Mar. 19, 2024

(65) Prior Publication Data

US 2025/0293601 A1 Sep. 18, 2025

(30) Foreign Application Priority Data

Mar. 24, 2023 (IN) ............................. 202341021303
Mar. 15, 2024 (IN) ............................. 202341021303

(51) Int. Cl.
*H02M 3/158* (2006.01)
*H02M 1/00* (2007.01)

(52) U.S. Cl.
CPC ....... *H02M 3/1588* (2013.01); *H02M 1/0009* (2021.05)

(58) Field of Classification Search
CPC .. H02M 3/158; H02M 3/1588; H02M 1/0058; H02M 1/0009
See application file for complete search history.

(56) References Cited

U.S. PATENT DOCUMENTS 6,879,136 B1 * 4/2005 Erisman ................ H02M 3/156 323/224
9,484,803 B2 11/2016 Turchi
(Continued)

FOREIGN PATENT DOCUMENTS

CN 203482091 U 3/2014
KR 10-2004-0103610 A 12/2004

OTHER PUBLICATIONS

Wu, et. al., “Adaptive Peak-Inductor-Current-Controlled PFM Boost Converter With a Near-Threshold Startup Voltage and High Efficiency,” IEEE Transactions on Power Electronics, Apr. 2015, pp. 1956-1965, vol. 30, No. 4.

*Primary Examiner* — Gustavo A Rosario-Benitez
(74) *Attorney, Agent, or Firm* — Muir Patent Law, PLLC

(57) ABSTRACT

Embodiments disclosed herein relate to synchronous boost converters, and to feedback based zero current detection (ZCD) circuits and operation methods for precisely detecting zero current crossing. The feedback based ZCD circuit may improve power efficiency of a fully on-chip, high gain, and high frequency synchronous boost converter by preventing generation of reverse inductor current in a dead phase of synchronous boost converter. The feedback based ZCD circuit may be a comparator based ZCD circuit for obtaining a precise Discontinuous Conduction Mode (DCM) operation with high efficiency. The feedback based ZCD circuit may be a voltage controlled delay line (VCDL) based ZCD circuit for obtaining a precise DCM operation with high efficiency. The feedback based ZCD circuit may generate a feedback control signal for a switch for accurate and adaptive turning off at all dynamic conditions of various circuits.

11 Claims, 16 Drawing Sheets

(56) References Cited

U.S. PATENT DOCUMENTS

| | | | | |
|---|---|---|---|---|
| 9,774,258 | B2 | 9/2017 | Campos | |
| 9,787,179 | B1 * | 10/2017 | Clarkin | G05F 1/40 |
| 10,054,617 | B2 | 8/2018 | Li et al. | |
| 10,454,370 | B2 * | 10/2019 | Babazadeh | H02M 1/32 |
| 10,931,194 | B2 | 2/2021 | Bawa | |
| 2007/0096707 | A1 * | 5/2007 | Xi | H02M 3/158 323/283 |
| 2009/0010035 | A1 * | 1/2009 | Williams | H02M 3/158 363/131 |
| 2010/0283391 | A1 * | 11/2010 | Braunshtein | H05B 47/185 340/310.11 |
| 2014/0028270 | A1 * | 1/2014 | Miyazaki | H02M 3/1588 323/271 |
| 2014/0320104 | A1 * | 10/2014 | Guo | H02M 3/1588 323/290 |
| 2015/0194882 | A1 * | 7/2015 | Ihs | H02M 3/156 323/272 |
| 2017/0170729 | A1 * | 6/2017 | Jung | H02M 3/158 |
| 2017/0187283 | A1 * | 6/2017 | Vaidya | H02M 3/1588 |
| 2017/0346396 | A1 | 11/2017 | Lakkimsetti et al. | |
| 2022/0209646 | A1 * | 6/2022 | Sun | H02M 1/0009 |

* cited by examiner

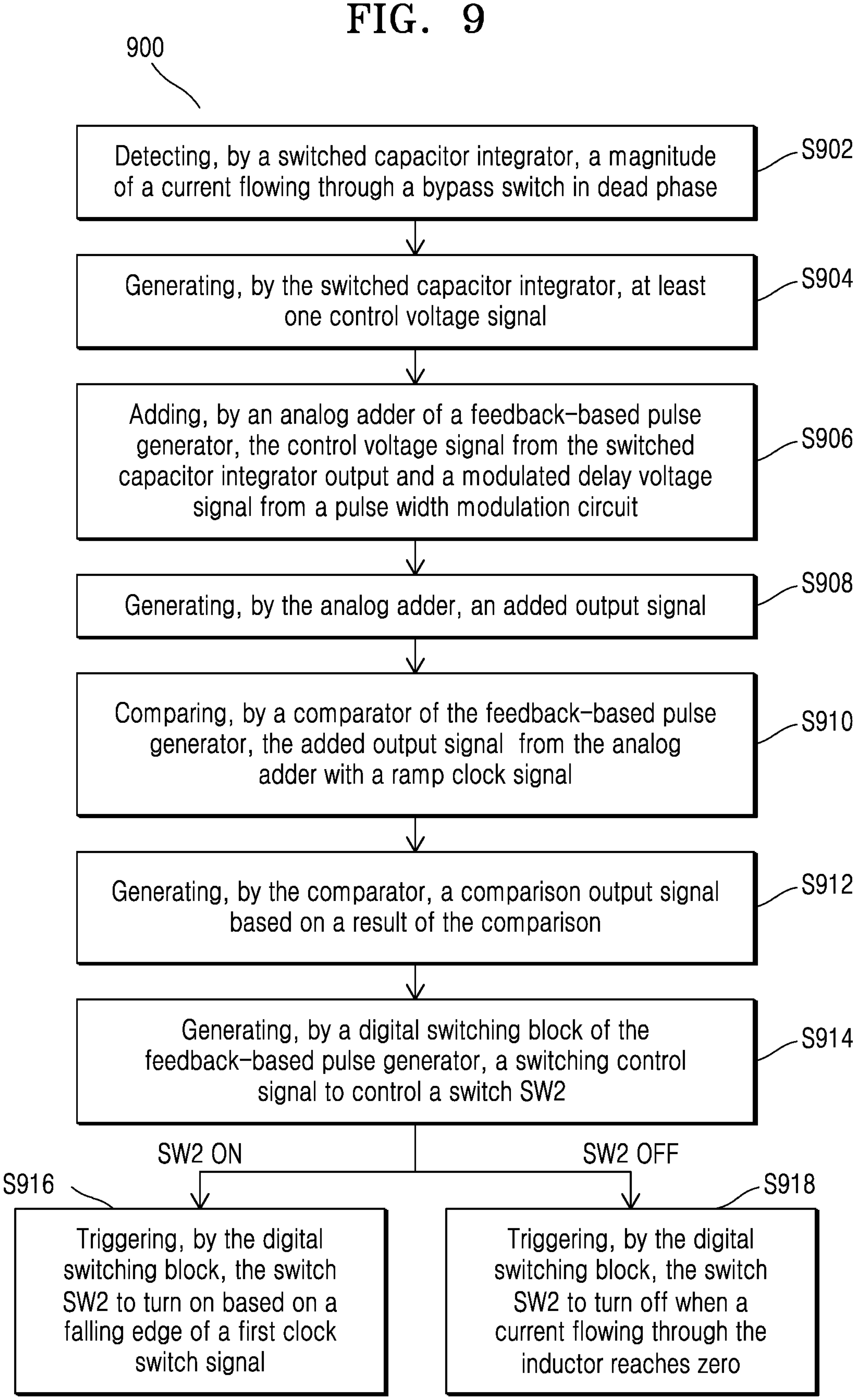

S902: Detecting, by a switched capacitor integrator, a magnitude of a current flowing through a bypass switch in dead phase S904: Generating, by the switched capacitor integrator, at least one control voltage signal S906: Adding, by an analog adder of a feedback-based pulse generator, the control voltage signal from the switched capacitor integrator output and a modulated delay voltage signal from a pulse width modulation circuit S908: Generating, by the analog adder, an added output signal S910: Comparing, by a comparator of the feedback-based pulse generator, the added output signal from the analog adder with a ramp clock signal S912: Generating, by the comparator, a comparison output signal based on a result of the comparison S914: Generating, by a digital switching block of the feedback-based pulse generator, a switching control signal to control a switch SW2

SW2 ON

S916: Triggering, by the digital switching block, the switch SW2 to turn on based on a falling edge of a first clock switch signal

SW2 OFF

S918: Triggering, by the digital switching block, the switch SW2 to turn off when a current flowing through the inductor reaches zero

FEEDBACK BASED ZERO CURRENT DETECTION CIRCUIT AND SYNCHRONOUS BOOST CONVERTER INCLUDING THE SAME

CROSS-REFERENCE TO RELATED APPLICATION(S)

This U.S. non-provisional patent application claims priority under 35 U.S.C. § 119 to Indian Patent Application No. 202341021303, filed on Mar. 24, 2023, in the Indian Patent Office, the disclosure of which is incorporated herein its entirety by reference.

BACKGROUND

Example embodiments disclosed herein relate to synchronous boost converters, and more particularly to synchronous boost converters including feedback based zero current detection (ZCD) circuits for precisely detecting zero current crossing.

Synchronous boost converters in a Discontinuous Conduction Mode (DCM) operate in three phases such as a charging phase, a discharging phase and a dead phase. FIG. 1A depicts a simplified synchronous boost converter 100. The synchronous boost converter 100 includes an inductor L and switches SW1 and SW2. The inductor L has a first end in connection with an input voltage source $V_{in}$ and a second end connected to a ground terminal through the switch SW1 and connected to an output terminal of the synchronous boost converter 100 through the switch SW2.

FIG. 1B depicts a timing diagram of the synchronous boost converter 100 indicated with clock switch signals CLK_SW1 and CLK_SW2, and an inductor current $I_L$ in DCM. In the charging phase “C”, the switch SW1 turns on and the inductor L (in series with the switch SW1) charges up by the input voltage source $V_{in}$. In the discharging phase “D”, the switch SW1 turns off and the switch SW2 turns on. The charged inductor L is connected to the output terminal of the synchronous boost converter 100, where the inductor discharges its current and boosts an output voltage $V_{OUT}$ of the output terminal. The dead phase starts when the inductor current completely discharges to zero and the switch SW2 turns off. In the dead phase, the inductor is neither charged nor discharged and is basically in dead state.

FIG. 2 depicts the synchronous boost converter with a zero current detector (ZCD) circuit and a pulse-width modulated (PWM) circuit. The PWM circuit and the ZCD circuit may be used to control the operation of the switches SW1 and SW2. The PWM circuit senses the output voltage level and accordingly controls the charging time of the inductor through the switch SW1. The ZCD circuit constantly monitors the discharge current of the inductor and turns off the switch SW2 when the inductor current discharges to zero.

FIG. 3 depicts the synchronous boost converter connected with a traditional ZCD circuit, the PWM circuit, and an anti-ringing circuit. In the traditional ZCD circuit, a comparator senses the zero current crossing time by sensing the change in sign of voltage drop across the switch SW2, due to change(s) in the inductor current direction. Since, the comparator and subsequent elements in the ZCD circuit have non-zero delays; the ZCD circuit takes some time to turn off the switch SW2 after sensing zero current crossing. In a high frequency, high gain, on-chip boost converter system, the discharge rate of the inductor L is usually very large. Delay in turning off the switch SW2 at correct zero current crossing point leads to substantial reverse charging of the inductor due to high discharge rate.

FIG. 4A depicts a simplified diagram of an anti-ringing circuit in the synchronous boost converter. In a dead phase, the inductor reverse current forms a closed loop path with the inductor and a bypass switch SW_BP of anti-ringing circuit, and dissipates the power which reduces the efficiency of the system, as depicted in FIG. 4B.

Therefore, the high gain on-chip boost converters working at higher frequencies have poor power efficiency due to delays in detecting zero current crossing by the traditional ZCD circuits. The high frequency, high gain on-chip boost converters suffer from poor efficiency due to the presence of large reverse inductor currents. The existing feedforward based schemes may not reduce the reverse currents as they may have an inherent delay which may not be compensated.

Object of Invention

The principal object of embodiments herein is to disclose feedback based Zero Current Detection (ZCD) circuits and methods for a synchronous boost converter for precise detection of zero current crossing.

Another object of embodiments herein is to disclose feedback based ZCD circuits and methods for improving power efficiency of a fully on-chip, high gain, and high frequency synchronous boost converter by preventing the circuit from generating reverse currents.

Another object of embodiments herein is to disclose a comparator based ZCD circuit for a synchronous boost converter for obtaining a precise Discontinuous Conduction Mode (DCM) operation with high efficiency.

Another object of embodiments herein is to disclose a Voltage Control Delay Line (VCDL) based ZCD circuit for a synchronous boost converter for obtaining a precise Discontinuous Conduction Mode (DCM) operation with high efficiency.

Another object of embodiments herein is to disclose feedback based ZCD circuits that may generate a feedback control for a switch of the boost converter by using a combination of a Pulse Width Modulation (PWM) feedback for output regulation and inductor current feedback for accurate and adaptive turning off at all dynamic conditions of the circuit.

SUMMARY

According to example embodiments, a feedback based Zero Current Detection (ZCD) circuit in a synchronous boost converter may include a switched capacitor integrator and a feedback-based pulse generator. The switched capacitor integrator may detect a magnitude of a current flowing through a bypass switch, and generate at least one control voltage signal based on the detected magnitude of the current. The feedback-based pulse generator may generate a clock switch signal to control a switch included in the synchronous boost converter at each switching cycle until the current flowing through the bypass switch reaches zero, based on the at least one control voltage signal from the switched capacitor integrator, and may turn on or turn off the switch connected between the inductor and an output terminal of the synchronous boost converter in response to the clock switch signal.

According to example embodiments, an operation method of a synchronous boost converter including an inductor, a bypass switch, first and second switches, and a feedback based ZCD circuit may include: detecting, in a first phase, by a switched capacitor integrator of the feedback based ZCD circuit, a magnitude of a current flowing through the bypass switch connected in parallel to the inductor and connected to a first end of each of the first and second switches through a first node; generating, by the switched capacitor integrator, at least one control voltage signal; generating, by a feedback-based pulse generator of the feedback based ZCD circuit, at least one pulse for constantly controlling the second switch connected between the first node and an output terminal of the synchronous boost converter at each switching cycle until the current flowing through the bypass switch reaches zero in the first phase, based on receiving the control voltage signal.

According to example embodiments, a synchronous boost converter may include: a first switch connected to a first node and configured to operate in response to a first clock switch signal; a second switch connected between the first node and an output terminal of the synchronous boost converter and configured to operate in response to a second clock switch signal; an inductor connected between the first node and an input voltage source; a bypass switch connected in parallel to the inductor; a pulse width modulation (PWM) circuit configured to generate the first clock switch signal based on a feedback voltage from an output voltage of the output terminal of the synchronous boost converter and a reference voltage; and a feedback based zero current detection ZCD circuit configured to generate the second clock switch signal based on the first clock switch signal and a current flowing through the bypass switch being reached zero.

BRIEF DESCRIPTION OF FIGURES

Example embodiments herein are illustrated in the accompanying drawings, throughout which like reference letters indicate corresponding parts in the various figures. The embodiments herein will be better understood from the following description with reference to the drawings, in which:

FIG. 9 is a flowchart depicting an operation method of a synchronous boost converter using the comparator based ZCD circuit, according to example embodiments.

DETAILED DESCRIPTION

Figure 1A:
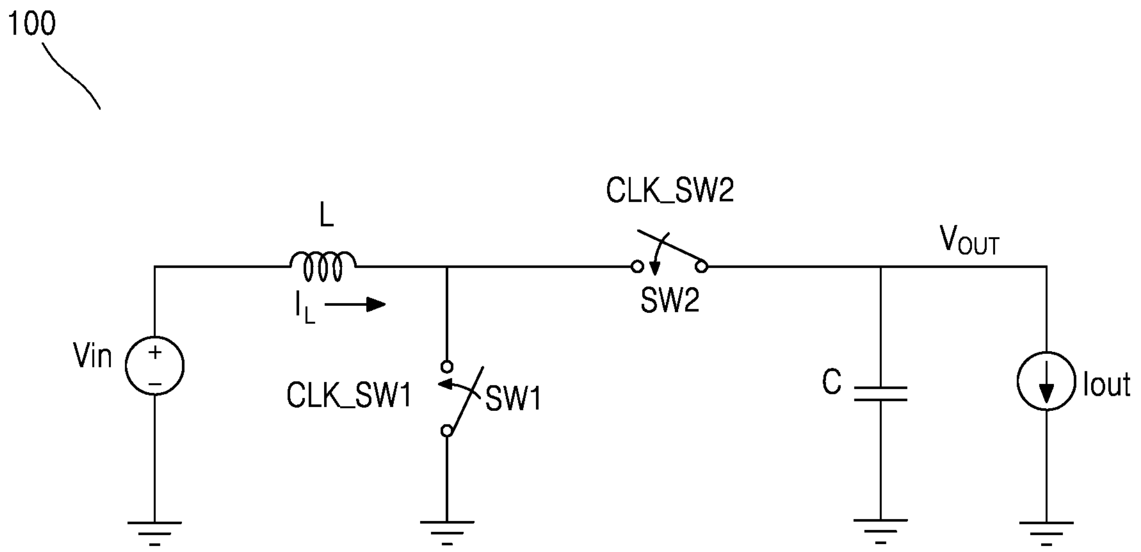
FIG. 1A depicts a simplified diagram synchronous boost converter.
Figure 1B:
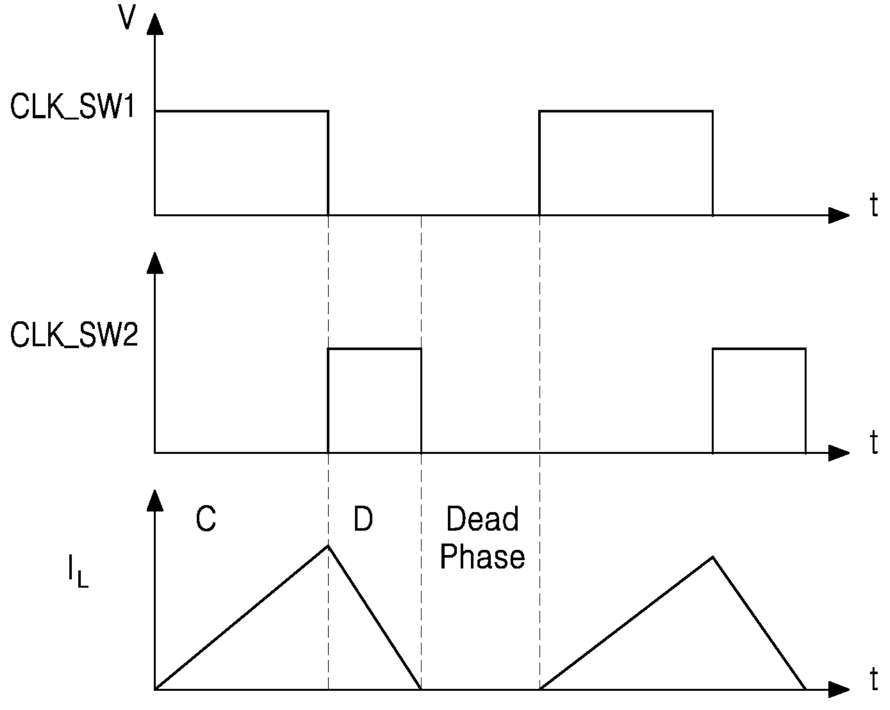
FIG. 1B depicts a timing diagram of the synchronous boost converter in discontinuous conduction mode (DCM)
Figure 2:
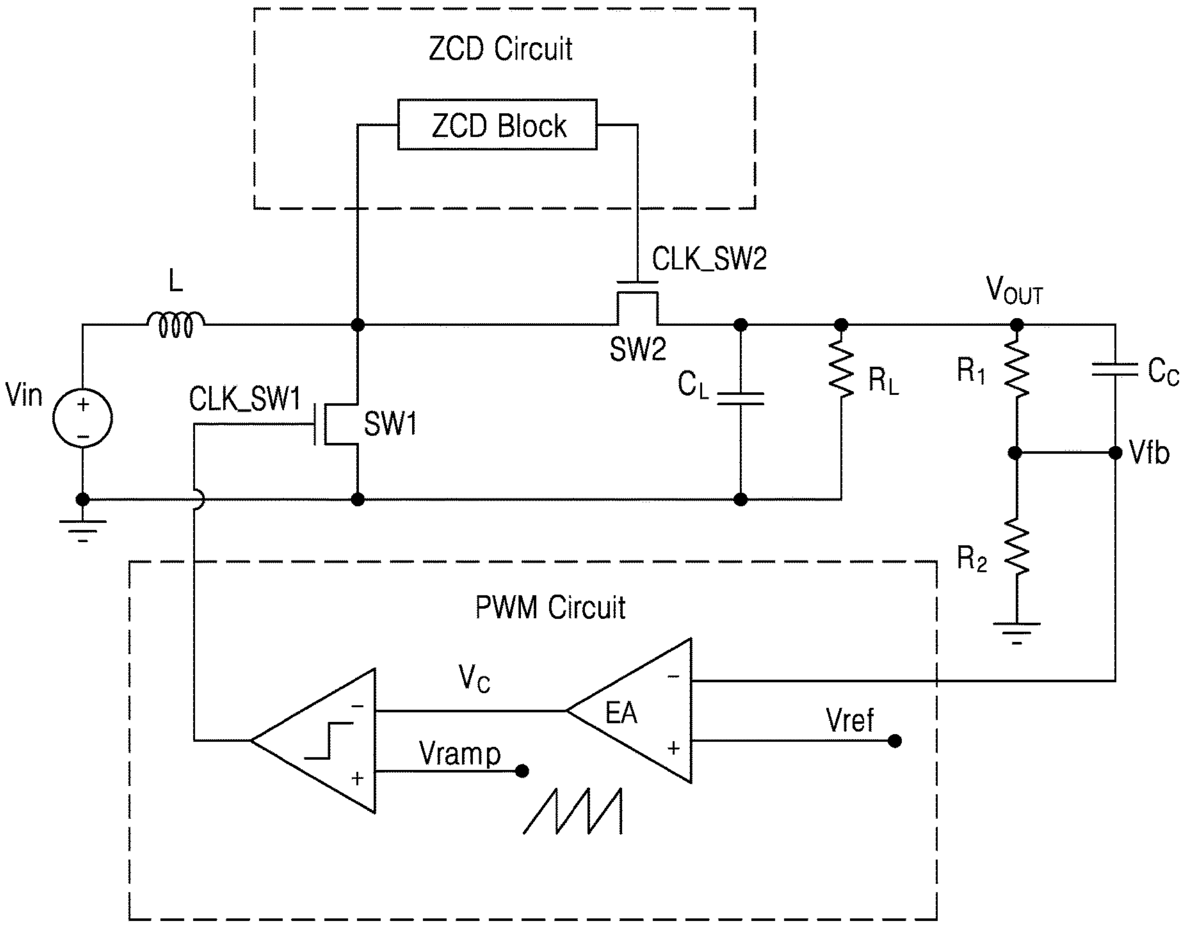
FIG. 2 depicts a synchronous boost converter with a zero current detector (ZCD) circuit and a pulse-width modulated (PWM) circuit.
Figure 3:
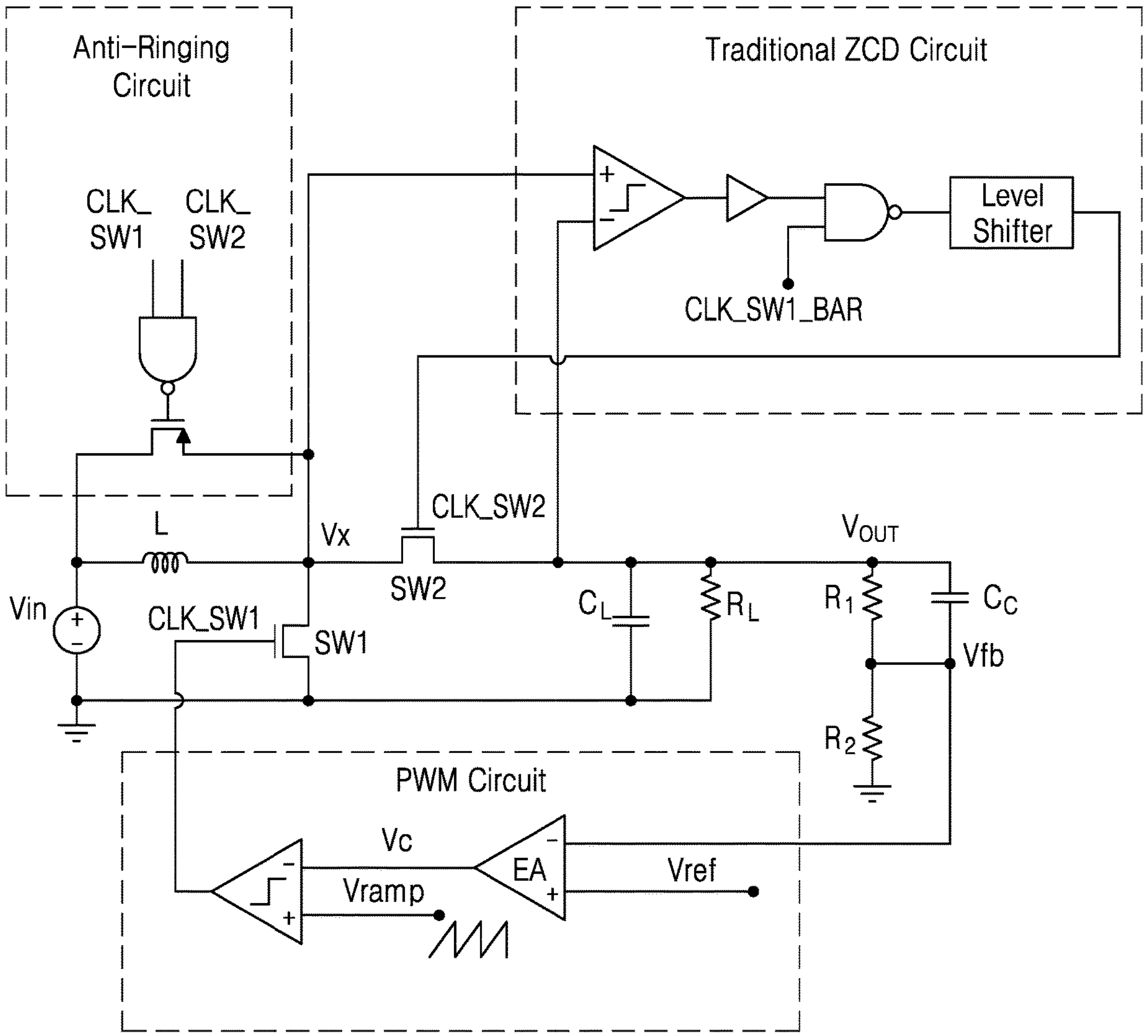
FIG. 3 depicts a synchronous boost converter connected with a traditional ZCD circuit, the PWM circuit, and an anti-ringing circuit.
Figure 4A:
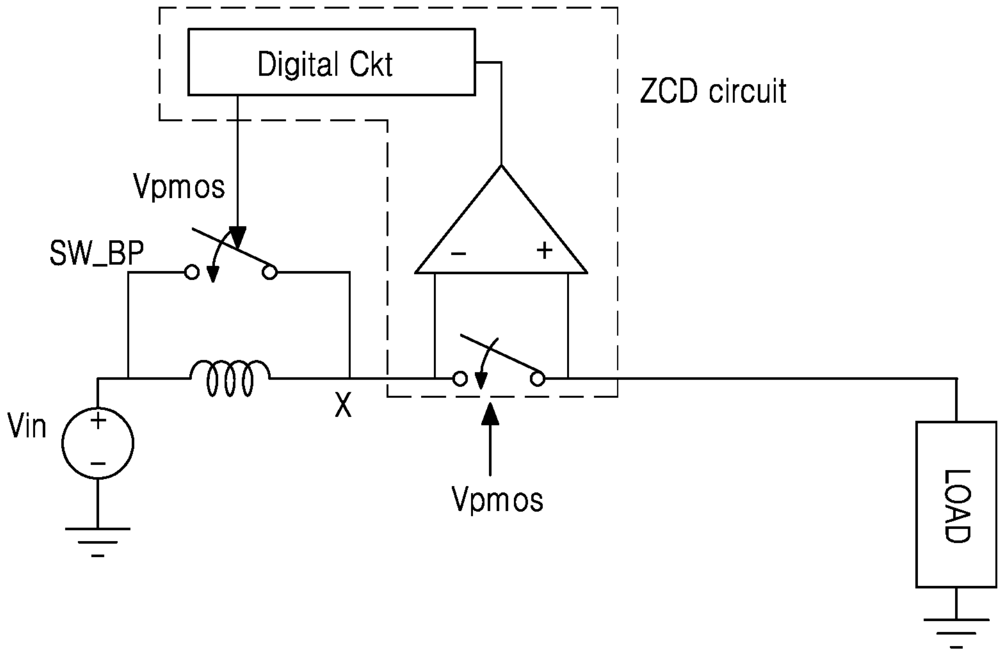
FIG. 4A depicts a synchronous boost converter with an anti-ringing circuit.
Figure 4B:
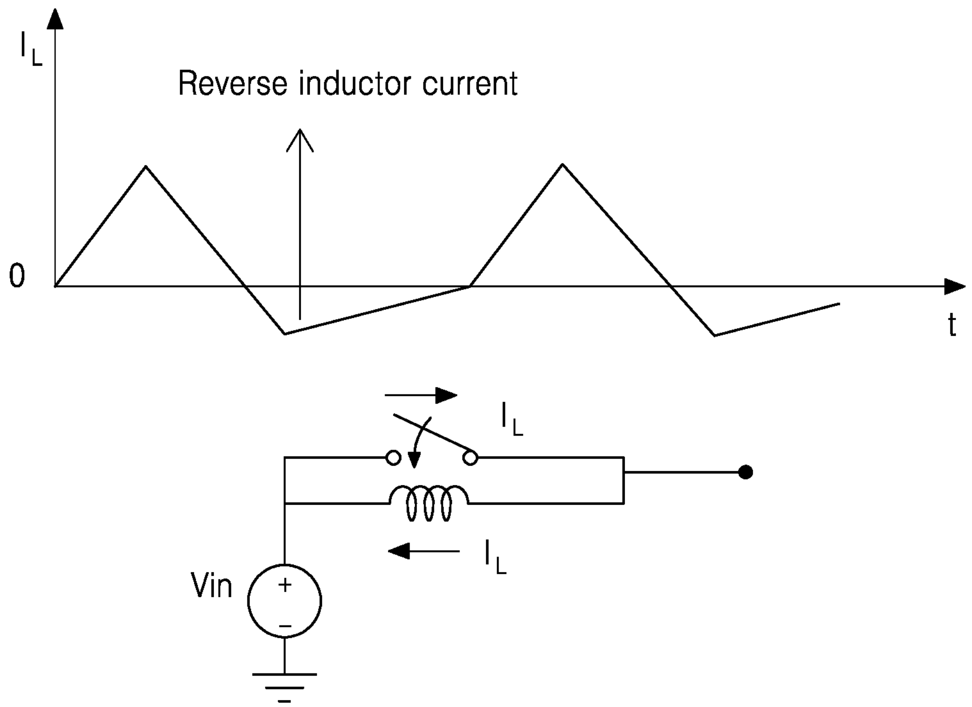
FIG. 4B depicts a graph indicating a reverse inductor current in the anti-ringing circuit.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The example embodiments herein may achieve a precise detection of zero current crossing for a precise Discontinuous Conduction Mode (DCM) operation in a synchronous boost converter using a feedback based Zero Current Detection (ZCD) circuit. Referring now to the drawings, and more particularly to FIGS. 5 through 10, where similar reference characters denote corresponding features consistently throughout the figures, there are shown example embodiments.

Figure 5:
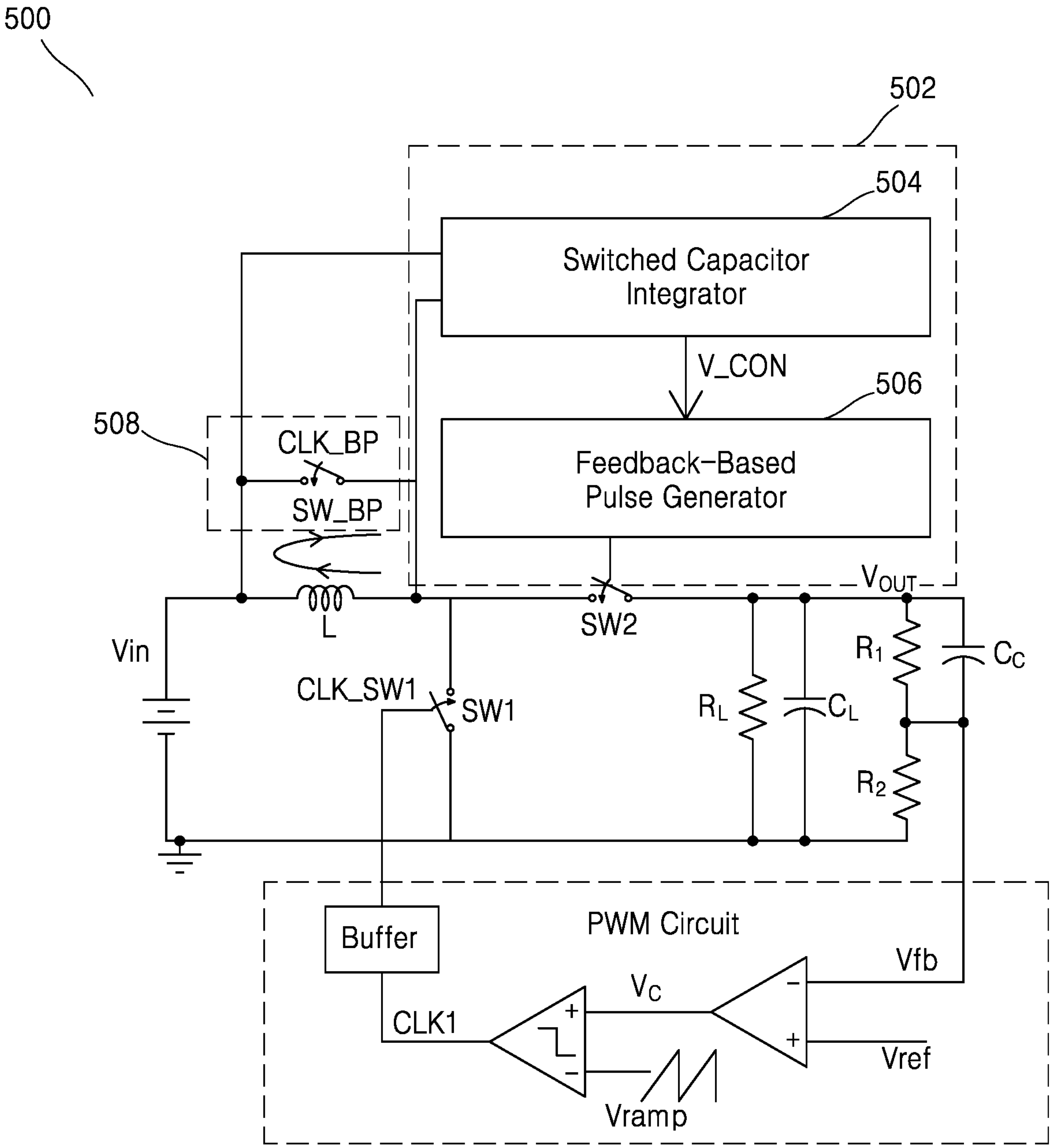
FIG. 5 depicts a synchronous boost converter connected with a feedback based ZCD circuit, according to example embodiments.

FIG. 5 depicts a synchronous boost converter 500 connected with a feedback based ZCD circuit 502. The feedback based ZCD circuit 502 includes a switched capacitor integrator 504 and a feedback-based pulse generator 506. The ZCD circuit 502 is coupled between an anti-ringing circuit 508 and a switch SW2. The anti-ringing circuit 508 includes a bypass switch SW_BP coupled in parallel to an inductor L of the synchronous boost converter 500. The bypass switch SW_BP may bypass unwanted currents generated at the inductor to the voltage source Vin in a dead phase. The feedback based ZCD circuit 502 may fix the issue of delay in turning the switch SW2 off. The feedback based ZCD circuit 502 may further sense whether the switch SW2 is turned off early and fix the delay accordingly. Voltage drop across the bypass switch SW_BP may be used as a feedback signal that may be fed into the feedback based ZCD circuit 502 for a precise ZCD control.

In an embodiment, the switched capacitor integrator 504 may detect a magnitude of a current flowing through the bypass switch SW_BP in the dead phase. The switched capacitor integrator 504 may detect the voltage across the bypass switch SW_BP which is proportional to current flowing through the bypass switch SW_BP in the dead phase and integrates the sensed input voltage. In the dead phase, both a switch SW1 and the switch SW2 are, turned off but the bypass switch SW_BP of the anti-ringing circuit 508 is turned on. The reverse inductor current takes the path of the bypass switch SW_BP forming a closed path by dropping a voltage across the bypass switch SW_BP. The voltage drop (Vsig) across the bypass switch SW_BP during the dead phase may have the information of the reverse current through the inductor L. Therefore, the magnitude of the current through the bypass switch SW_BP may be detected by sampling the voltage drop (Vsig) across the bypass switch SW_BP which is coupled in parallel with the inductor L in the dead phase. The sampling of the voltage drop (Vsig) provides the delay information to decide when the switch SW2 to be turned off. The switched capacitor integrator 504 may generate at least one control voltage signal V_CON based on the detected magnitude of the current.

In an embodiment, the feedback-based pulse generator 506 may generate pulses to control proper turning off of the switch SW2 such that there is negligible inductor current in the dead phase that flows through the bypass switch SW_BP. The feedback-based pulse generator 506 controls the switch SW2, on receiving the control voltage signal V_CON from the switched capacitor integrator 504.

In an embodiment, the ZCD circuit 502 may be a comparator based ZCD circuit. In an embodiment, the ZCD circuit 502 may be a Voltage Controlled Delay Line (VCDL) based ZCD Circuit.

Figure 6A:
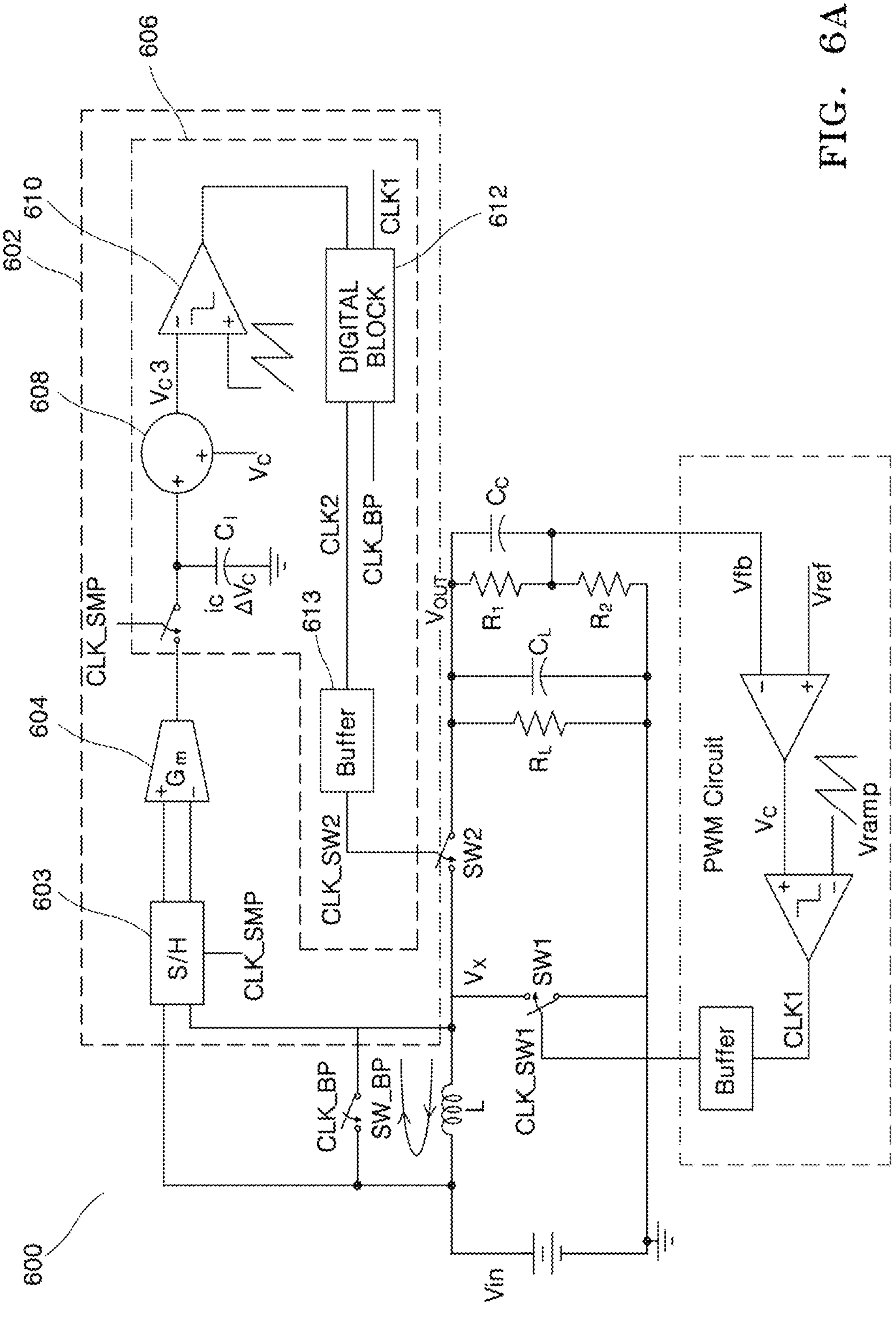
FIG. 6A depicts a synchronous boost converter with a comparator based ZCD circuit, according to example embodiments.
Figure 6B:
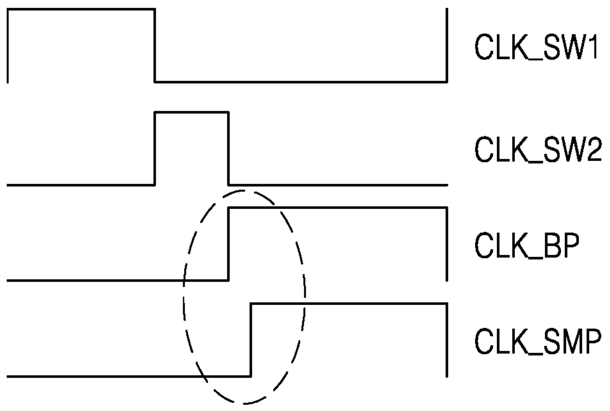
FIG. 6B depicts a timing diagram of the comparator based ZCD circuit, according to example embodiments.

FIG. 6A depicts a synchronous boost converter 600 with a comparator based ZCD circuit 602. In an embodiment, the comparator based ZCD circuit 602 includes a sample and hold circuit (S/H) 603, a switched capacitor integrator 604 and a feedback-based pulse generator 606.

The sample and hold circuit (S/H) 603 may sample the voltage drop (Vsig) across the bypass switch SW_BP and hold the sampled voltage value. The sampling pulse for sampling the voltage drop is generated with a delay after the SW_BP is turned on. A clock signal CLK_SMP for sampling pulse and a clock signal CLK_BP for the bypass switch are depicted in a timing diagram of FIG. 6B. From the timing diagram, the switch SW2 is triggered to be turned on by a falling edge of a feedback clock signal CLK1 or a clock switch signal CLK_SW1 and to be turned off when the current flowing through the inductor reaches zero.

The sampled voltage value is fed into the switched capacitor integrator 604. The switched capacitor integrator 604 accumulates the sampled voltage value, applies an integration function and provides at least one control voltage signal V_CON.

The feedback-based pulse generator 606 may include an analog adder 608, a comparator 610, a digital switching block 612, and a buffer 613. The analog adder 608 may add the control voltage signal V_CON obtained from the switched capacitor integrator 604 output and a modulated delay voltage signal (Vc) from a Pulse Width Modulation (PWM) circuit connected to a switch SW1. The PWM circuit connected to the switch SW1 may sense the output voltage level of the synchronous boost converter 600 and accordingly control the charging time of inductor L through the switch SW1. The analog adder 608 may then generate an added output signal (Vc3) from the control voltage signal V_CON obtained from the switched capacitor integrator 604 output and the modulated delay voltage signal (Vc) obtained from the PWM circuit.

The comparator 610 may compare the added output signal (Vc3) from the analog adder 608 with a ramp clock signal Vramp. The comparator 610 may generate a comparison output signal based on a result of the comparison.

Figure 6C:
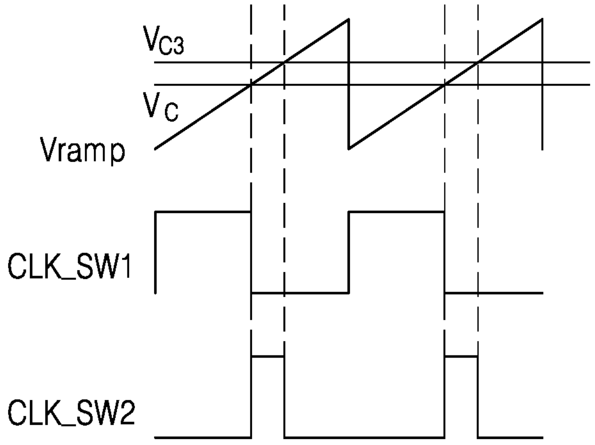
FIG. 6C depicts a timing diagram indicating generation of switching control signals for switches SW1 and SW2 of the comparator based ZCD circuit, according to example embodiments.

The digital switching block 612 may receive the output signal from the comparator 610 and a feedback clock signal CLK1 from the PWM circuit. The digital switching block 612 may generate a switching control signal CLK2 to control the switch SW2 based on the received signals. The buffer 613 may output a clock switch signal CLK_SW2 to operate the switch SW2 by receiving the switching control signal CLK2. In an embodiment, the buffer 613 may be omitted. In this case, the switching control signal CLK2 may control the switch SW2 as the clock switch signal CLK_SW2. In an embodiment, the digital switching block 612 may trigger the switch SW2 to turn on, based on a falling edge of the feedback clock signal CLK1. For example, since the switch SW2 may be turned on only after the switch SW1 turns off, the digital switching block 612 should know when the switch SW1 has turned off. Therefore, the feedback clock signal CLK1 from the PWM circuit aids in turning on the switch SW2. In an embodiment, the digital switching block 612 may trigger the switch SW2 to turn off, when a current through the inductor crosses zero. FIG. 6C depicts a timing diagram indicating generation of clock switch signals CLK_SW1 and CLK_SW2 for the switches SW1 and SW2. As depicted in FIG. 6C, the clock switch signal CLK_SW1 goes to a low level when the modulated delay voltage signal Vc crosses the ramp clock signal Vramp. The digital switching block 612 controls the clock switch signal CLK_SW2 to have a high level as soon as the clock switch signal CLK_SW1 goes to a low level and controls the clock switch signal CLK_SW2 to have a low level when the comparator 610 triggers (when the added output signal Vc3 crosses the ramp clock signal Vramp).

Therefore, the switch SW2 may be controlled using the feedback-based pulse generator 606 in an upcoming cycle to reduce the current flowing through the inductor L, based on the obtained control voltage signal V_CON from the switched capacitor integrator 604. In the upcoming cycles, the switch SW2 may be turned off early, so that a voltage error value obtained from the control voltage signal V_CON of the switched capacitor integrator 604 may be corrected. For the subsequent cycles, the voltage error value may become zero and the output from the switched capacitor integrator 604 may settle to a steady state value. Finally, after few cycles of operation, the switch SW2 may be turned off precisely at zero crossing due to regular feedback of the inductive current.

Figure 6D:
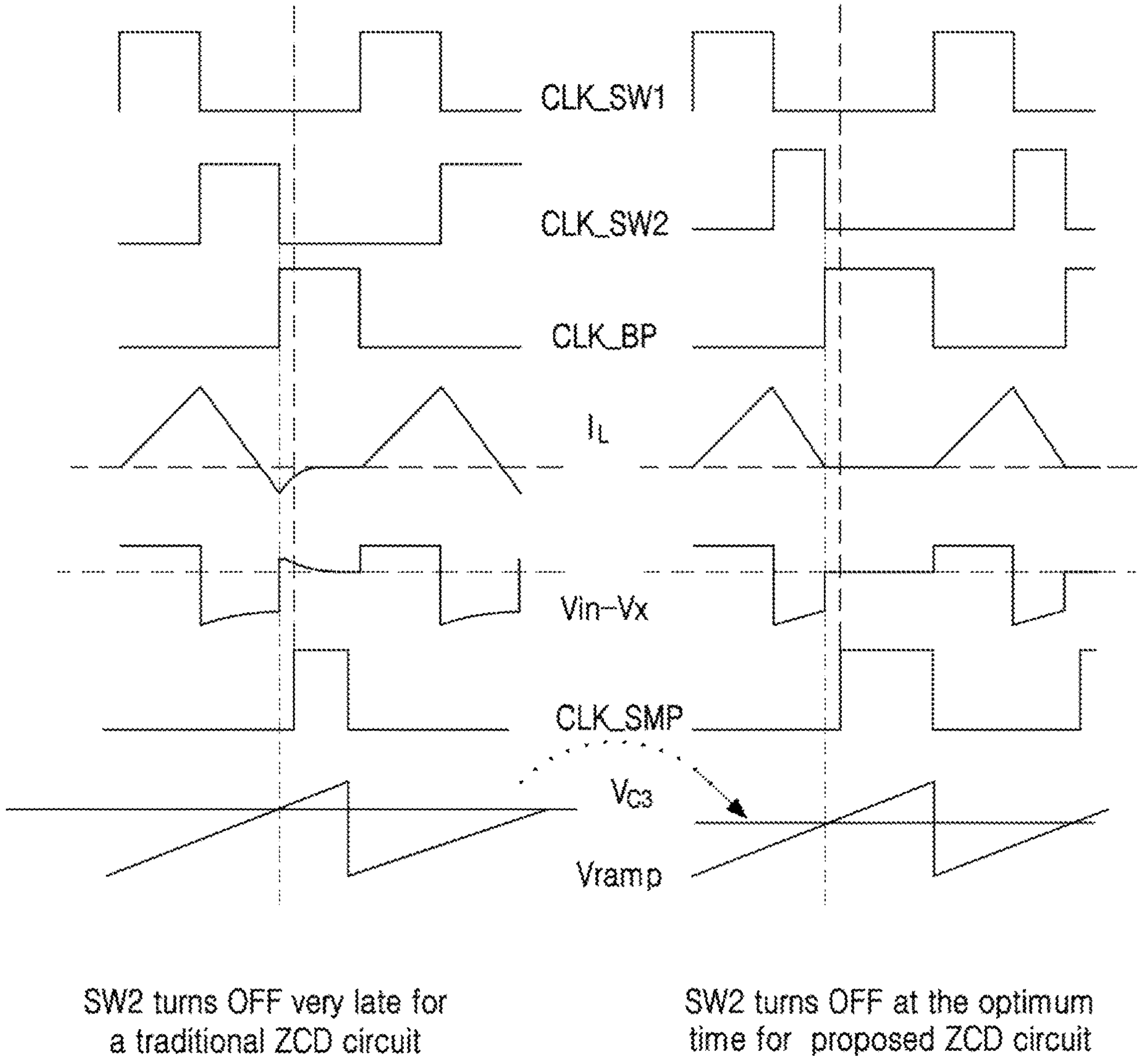
FIG. 6D depicts a timing diagram indicating difference between a switch SW2 controls for a traditional ZCD circuit and the proposed feedback based ZCD circuit, according to example embodiments.

FIG. 6D depicts a timing diagram indicating difference between the switch SW2 controls for a traditional ZCD circuit and the proposed feedback based ZCD circuit 502. The timing diagram depicts that the switch SW2 is turned off very late for the traditional ZCD circuit, whereas the switch SW2 is turned off at optimum time for the proposed feedback based ZCD circuit 502 or the comparator based ZCD circuit 602.

Figure 7A:
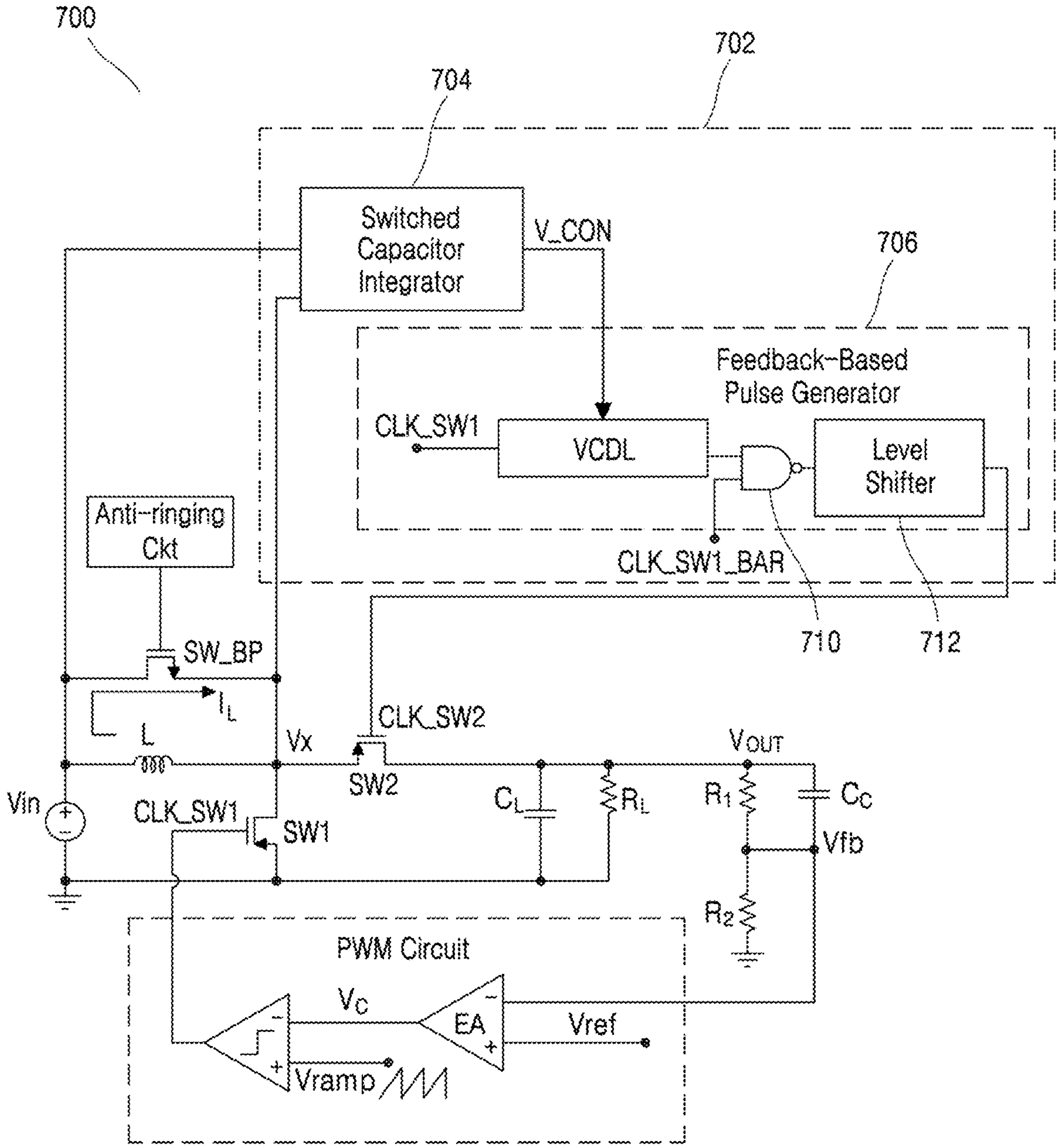
FIG. 7A depicts the synchronous boost converter with a VCDL based ZCD circuit, according to example embodiments.

FIG. 7A depicts a synchronous boost converter 700 with a VCDL based ZCD circuit 702. In an embodiment, the VCDL based ZCD circuit 702 includes a switched capacitor integrator 704 and a feedback-based pulse generator 706.

The switched capacitor integrator 704 may be fed with the sampled voltage value obtained from a sample and hold circuit (S/H) (not shown). The sampled voltage value is obtained by sampling the voltage drop (Vsig) across the bypass switch SW_BP. The switched capacitor integrator 704 accumulates the sampled voltage value, applies an integration function and provides a control voltage signal (V_CON).

The feedback-based pulse generator 706 includes a VCDL 708, a NAND gate 710, and a level shifter 712. The VCDL 708 may generate a delayed clock signal based on the control voltage signal V_CON obtained from the switched capacitor integrator 704 and the clock switch signal CLK_SW1.

The NAND gate 710 may receive the generated delayed clock signal from the VCDL 708 and a clock bar signal CLK_SW1_BAR of inversion of the clock switch signal CLK_SW1 and generate a switching control signal CLK2 to control the switch SW2. In an embodiment, the NAND gate 710 may trigger the switch SW2 to turn on, based on the falling edge of the clock switch signal CLK_SW1. In a charging phase, the clock switch signal CLK_SW1 is high while the clock bar signal CLK_SW1_BAR is low. As soon as the charging phase is completed, the output of the ZCD circuit 702 goes to a low level and the switch SW2 turns on. In an embodiment, the NAND gate 710 may trigger the switch SW2 to turn off, when the current through the inductor crosses zero. The pulse width of the clock signal controlling switch SW2 is equal to delay (D) of the VCDL line. The control voltage signal V_CON through a feedback circuit may be used to set the delay of the VCDL line, so that the switch SW2 turns off exactly when zero current crossing occurs. Further, in the earlier cycle, if the pulse width is reduced to 2 sec, then in the subsequent cycle, the pulse width may reduce the VCDL line to 1.5 sec.

The generated control signal from the VCDL 708 together with the NAND gate 710 having two inputs i.e., the clock switch signal CLK_SW1 and the clock bar signal CLK_SW1_BAR, ensure that the switch SW2 turns on after the switch SW1 has turned off, and the switch SW2 turns off only when the current has fallen exactly to zero.

The level shifter 712 may convert a lower magnitude of the switching control signal to a higher magnitude to match with an output of the synchronous boost converter 700. Since, the synchronous boost converter 700 produces a higher output voltage from a lower value of input voltage, regular low values of signals may not be used to control the switch SW2. The switch SW2 may not be turned on and turned off using the lower voltage values. Therefore, after receiving the switching control signal CLK2 from the NAND gate 710 with a lower value of input voltage, the level shifter 712 may translate the switching control signal CLK2 to a value that is high enough to match with the magnitude of the output voltage of the synchronous boost converter 700. Thus, the level shifter 712 boosts the switching control signals CLK2 to effectively control the switch SW2.

Figure 7B:
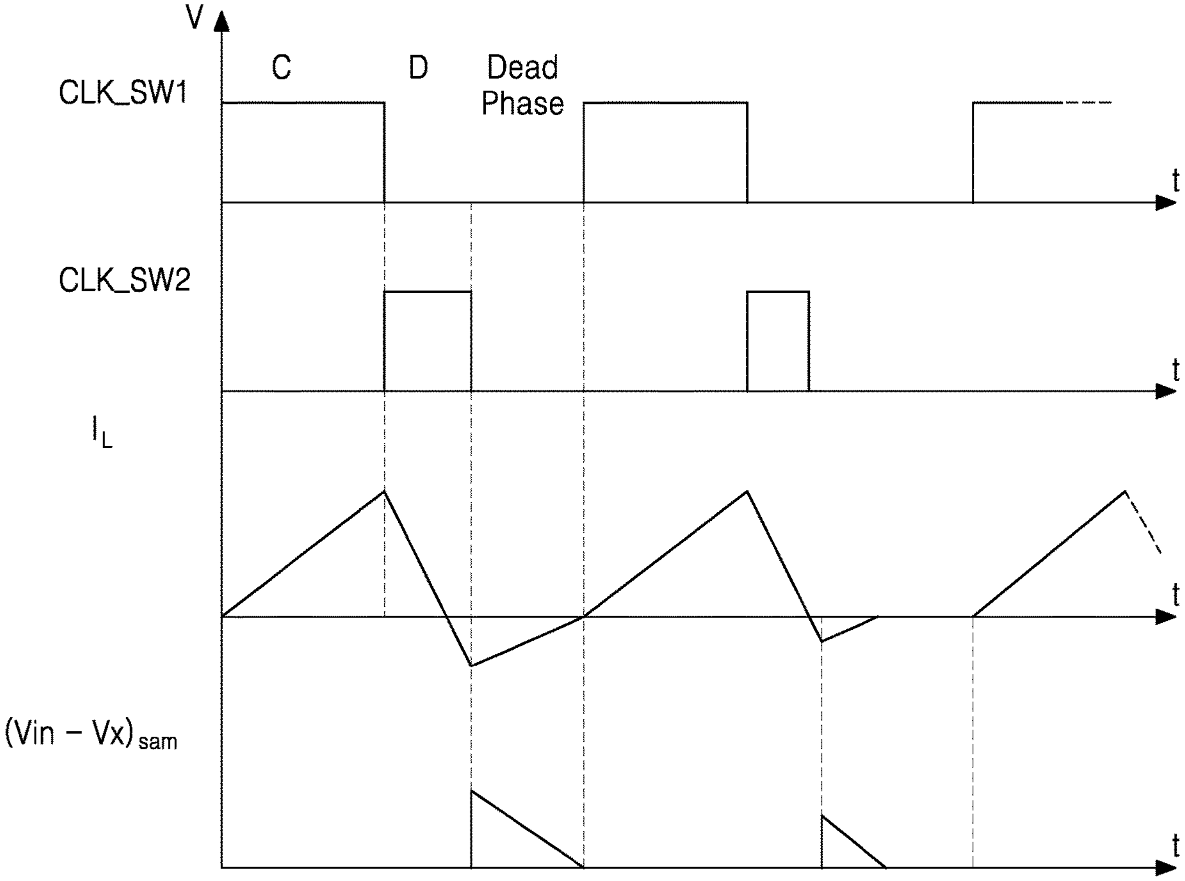
FIG. 7B depicts a timing diagram of a precise ZCD operation using the VCDL based ZCD circuit, according to example embodiments.

FIG. 7B depicts a timing diagram of a precise ZCD operation using the VCDL based ZCD circuit 702. In a charging phase (C), the inductor L is connected to a ground terminal through the switch SW1. In this phase, the inductor L is charged to a current value Ip. In a next phase i.e., a discharging phase, the inductor L is disconnected from the ground terminal and is connected to an output terminal of the synchronous boost converter 700 through the switch SW2. In this phase, the inductor L discharges and provides charge to an output load capacitor $C_L$. In a third phase i.e., a dead phase, due to delay in turning off the switch SW2, the inductor L charges in reverse direction leading to negative inductor current in the dead phase. The negative inductor current flows through the bypass switch SW_BP in the dead phase. Voltage signal produced across the bypass switch is sensed by the switched capacitor integrator which in turn generates a control voltage signal V_CON to modulate the delay of VCDL line. The delay of VCDL line is reduced slightly so that in the next discharging phase, the switch SW2 turns off earlier than before and there is lesser reverse current. This cycle continues until there is zero negative current in the dead phase.

Figure 8:
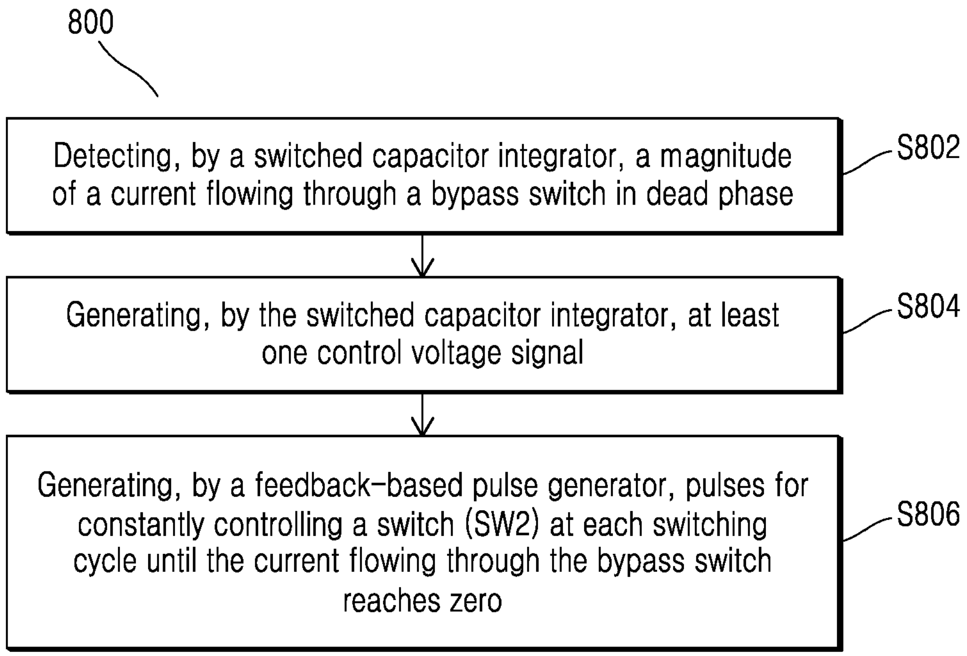
FIG. 8 is a flowchart depicting an operation method of a synchronous boost converter using the feedback based ZCD circuit, according to example embodiments.

FIG. 8 is a flowchart depicting an operation method of the synchronous boost converter 500 using the feedback based ZCD circuit 502 according to example embodiments.

Referring to FIG. 8, an operation method 800 for providing a zero current switching in a synchronous boost converter 500 using the feedback based ZCD circuit 502. The operation method 800 includes detecting, by the switched capacitor integrator 504 of the feedback based ZCD circuit 502, a magnitude of a current flowing through a bypass switch in a dead phase, as depicted in step S802; generating, by the switched capacitor integrator 504 of the feedback based ZCD circuit 502, at least one control voltage signal, as depicted in step S804, based on the magnitude of current flowing through the bypass switch; and generating, by the feedback-based pulse generator 506 of the feedback based ZCD circuit 502, pulses (e.g., the clock switch signal CLK_SW2) for constantly controlling the switch SW2 at each switching cycle until the current flowing through the bypass switch reaches zero in the dead phase, as depicted in step S806, based on the control voltage signal received from the switched capacitor integrator 504.

The various operations in FIG. 8 may be performed in the order presented, in a different order or simultaneously. Further, in some embodiments, some operations described in FIG. 8 may be omitted.

FIG. 9 is a flowchart depicting an operation method of the synchronous boost converter 600 using the comparator based ZCD circuit 602 according to example embodiments.

Referring to FIG. 9, an operation method 900 for providing a zero current switching in a synchronous boost converter 600 using the comparator based ZCD circuit 602. The operation method 900 includes detecting, by the switched capacitor integrator 604, a magnitude of current flowing through the bypass switch in a dead phase, as depicted in step S902; generating, by the switched capacitor integrator 604, at least one control voltage signal, as depicted in step S904, based on the detected magnitude of the current; and adding, by the analog adder 608 of the feedback-based pulse generator 606, the at least one control voltage signal from the switched capacitor integrator 604 output and a modulated delay voltage signal (Vc) from the PWM circuit, as depicted in step S906.

Thereafter, the operation method 900 includes generating, by the analog adder 608 of the feedback-based pulse generator 606, an added output signal (Vc3) based on a result of the addition, as depicted in step S908; comparing, by a comparator 610 of the feedback-based pulse generator 606, the added output signal (Vc3) from the analog adder 608 with a ramp clock signal (Vramp), as depicted in step S910; and generating, by the comparator 610, a comparison output signal, as depicted in step S912, based on a result of the comparison.

Thereafter, the operation method 900 includes generating, by a digital switching block 612 of the feedback-based pulse generator 606, a switching control signal to control the switch SW2, as depicted in step S914, based on receiving the comparison output signal from the comparator 610 and a feedback clock signal (CLK1) or a first clock switch signal CLK_SW1 from the PWM circuit; triggering, by the digital switching block 612, the switch SW2 to turn on, as depicted in step S916, based on a falling edge of a feedback clock signal (CLK1); and triggering, by the digital switching block 612, the switch SW2 to turn off, as depicted in step S918, when a current flowing through the inductor reaches zero.

The various operations in FIG. 9 may be performed in the order presented, in a different order or simultaneously. Further, in some embodiments, some operations described in FIG. 9 may be omitted.

Figure 10:
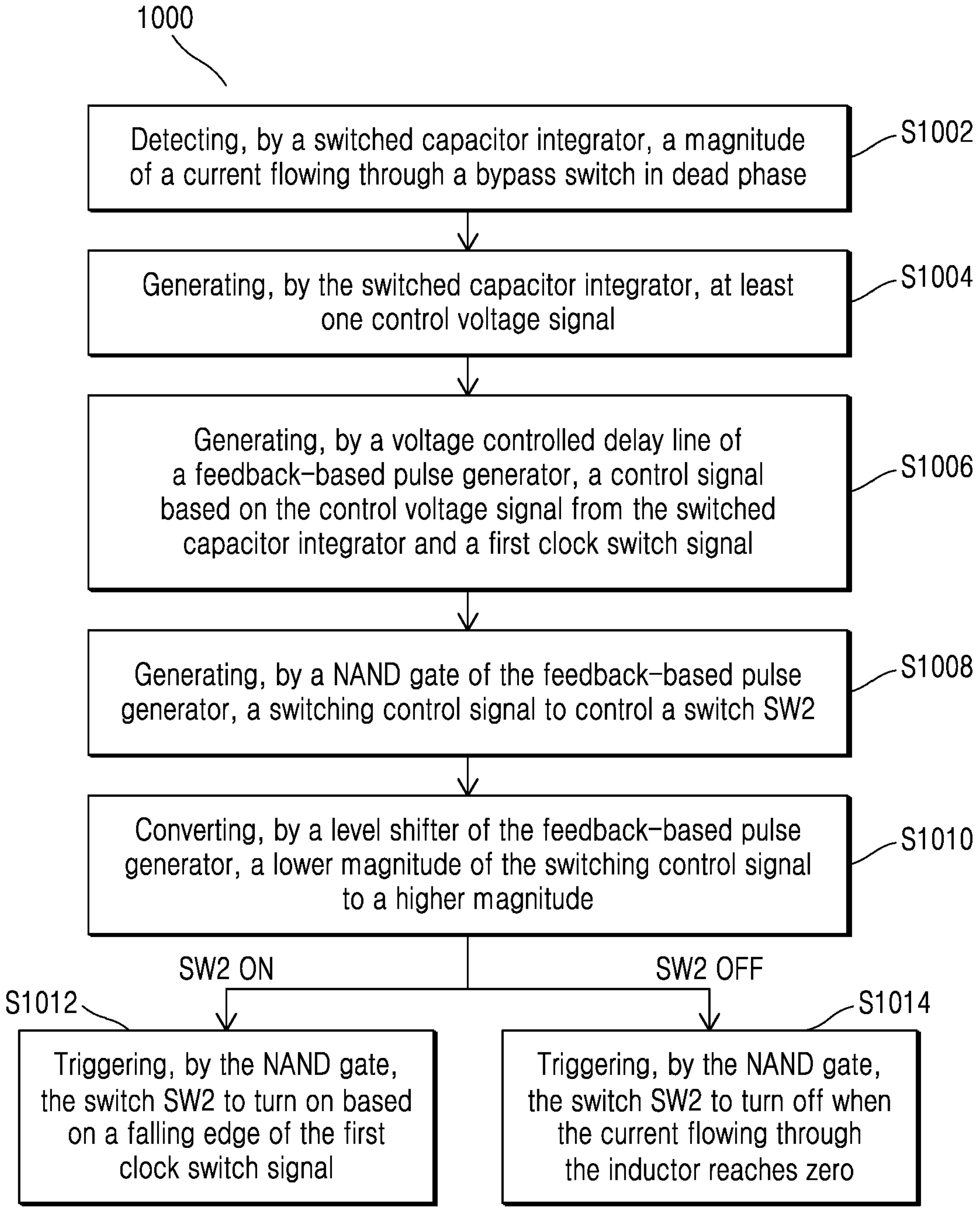
FIG. 10 is a flowchart depicting an operation method of a synchronous boost converter using the VCDL based ZCD circuit, according to example embodiments.

FIG. 10 is a flowchart depicting an operation method of the synchronous boost converter 700 using the VCDL based ZCD circuit 702 according to example embodiments.

Referring to FIG. 10, an operation method 1000 for providing a zero current switching in a synchronous boost converter 700 using the VCDL based ZCD circuit 702. The operation method 1000 includes detecting, by the switched capacitor integrator 704 of the VCDL based ZCD circuit 702, a magnitude of current flowing through the bypass switch in a dead phase, as depicted in step S1002; and generating, by the switched capacitor integrator 704, at least one control voltage signal, as depicted in step S1004, based on the detected magnitude of the current.

Thereafter, the operation method 1000 includes generating, by the VCDL 708 of the feedback-based pulse generator 706, at least one control voltage signal from the switched capacitor integrator 704 and a clock switch signal (CLK_SW1), as depicted in step S1006; and generating, by the NAND gate 710 of the feedback-based pulse generator 706, a switching control signal to control the switch SW2, as depicted in step S1008, based on receiving the control signal from the VCDL 708 and a clock bar signal (CLK_SW1_BAR) of inversion of the clock switch signal (CLK_SW1).

Thereafter, the operation method 1000 includes converting, by the level shifter 712 of the feedback-based pulse generator 706, a lower magnitude of the switching control signal to a higher magnitude, as depicted in step S1010, to match with an output voltage of the output terminal of the synchronous boost converter 700; triggering, by the NAND gate 710, the switch SW2 to turn on based on a falling edge of the clock switch signal (CLK_SW1), as depicted in step S1012; and triggering, by the NAND gate 710, the switch SW2 to turn off when the current through the inductor crosses zero, as depicted in step S1014.

The various operations in FIG. 10 may be performed in the order presented, in a different order or simultaneously. Further, in some embodiments, some operations described in FIG. 10 may be omitted.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein may be practiced with modification within the spirit and scope of the present disclosure as defined in the appended claims.

What is claimed is:

1. A feedback based zero current detection (ZCD) circuit in a synchronous boost converter, the feedback based ZCD circuit comprising:

a switched capacitor integrator configured to:

detect a magnitude of a current flowing through a bypass switch connected in parallel to an inductor included in the synchronous boost converter, and generate at least one control voltage signal based on the detected magnitude of the current flowing through the bypass switch; and a feedback-based pulse generator configured to:

generate a clock switch signal to control a switch included in the synchronous boost converter at each switching cycle until the current flowing through the bypass switch reaches zero, based on the at least one control voltage signal from the switched capacitor integrator, and turn on or turn off the switch connected between the inductor and an output terminal of the synchronous boost converter in response to the clock switch signal, wherein the clock switch signal is a second clock switch signal, wherein the feedback-based pulse generator is configured to generate the second clock switch signal based on a first clock switch signal from a pulse width modulation (PWM) circuit included in the synchronous boost converter, and wherein the feedback-based pulse generator comprises:

an analog adder configured to:

add the at least one control voltage signal from the switched capacitor integrator and a modulated delay voltage signal from the PWM circuit, and generate an added output signal based on the at least one control voltage signal and the modulated delay voltage signal;

a first comparator configured to:

compare the added output signal from the analog adder with a ramp clock signal, and generate a comparison output signal based on a result of the comparison of the first comparator; and a digital switching block configured to:

generate the second clock switch signal in response to the comparison output signal from the first comparator and the first clock switch signal, trigger the switch to turn on based on a falling edge of the first clock switch signal, and trigger the switch to turn off based on a current flowing through the inductor being reached zero.

2. The feedback based ZCD circuit of claim 1, wherein the switched capacitor integrator is configured to detect the magnitude of the current flowing through the bypass switch by sampling a voltage drop across the bypass switch.

3. The feedback based ZCD circuit of claim 1, wherein the feedback-based pulse generator is configured to generate the clock switch signal based on the current flowing through the bypass switch being reached zero.

4. An operation method of a synchronous boost converter including an inductor, a bypass switch, first and second switches, and a feedback based zero current detection (ZCD) circuit, the operation method comprising:

detecting, in a first phase, by a switched capacitor integrator of the feedback based ZCD circuit, a magnitude of a current flowing through the bypass switch connected in parallel to the inductor and connected to a first end of each of the first and second switches through a first node;

generating, by the switched capacitor integrator, at least one control voltage signal based on the detected magnitude of the current; and generating, by a feedback-based pulse generator of the feedback based ZCD circuit, at least one pulse for constantly controlling the second switch connected between the first node and an output terminal of the synchronous boost converter at each switching cycle until the current flowing through the bypass switch reaches zero in the first phase, based on receiving the at least one control voltage signal, wherein the generating of the at least one pulse includes:

adding, by an analog adder of the feedback-based pulse generator, the at least one control voltage signal from the switched capacitor integrator and a modulated delay voltage signal from a pulse width modulation (PWM) circuit;

generating, by the analog adder, an added output signal based on a result of the adding;

comparing, by a comparator of the feedback-based pulse generator, the added output signal from the analog adder with a ramp clock signal;

generating, by the comparator, a comparison output signal based on a result of the comparison; and generating, by a digital switching block of the feedback-based pulse generator, the at least one pulse to control the second switch, based on receiving the comparison output signal from the comparator and a feedback clock signal from the PWM circuit.

5. The operation method of claim 4, wherein the detecting of the magnitude of the current flowing through the bypass switch includes sampling a voltage drop across the bypass switch in the first phase.

6. The operation method of claim 4, wherein the generating of the at least one pulse further includes:

triggering, by the digital switching block, the second switch to turn on based on a falling edge of the feedback clock signal; and triggering, by the digital switching block, the second switch to turn off when a current flowing through the inductor reaches zero.

7. A synchronous boost converter comprising:

a first switch connected to a first node and configured to operate in response to a first clock switch signal;

a second switch connected between the first node and an output terminal of the synchronous boost converter and configured to operate in response to a second clock switch signal;

an inductor connected between the first node and an input voltage source;

a bypass switch connected in parallel to the inductor;

a pulse width modulation (PWM) circuit configured to generate the first clock switch signal based on a feedback voltage from an output voltage of the output terminal of the synchronous boost converter and a reference voltage; and a feedback based zero current detection (ZCD) circuit configured to generate the second clock switch signal based on the first clock switch signal and a current flowing through the bypass switch being reached zero, wherein the feedback based ZCD circuit comprises:

a switched capacitor integrator configured to detect a magnitude of the current flowing through the bypass switch, and generate at least one control voltage signal based on the detected magnitude of the current; and a feedback-based pulse generator configured to generate the second clock switch signal based on the at least one control voltage signal and the first clock switch signal, wherein the feedback-based pulse generator comprises:

a voltage controlled delay line (VCDL) configured to generate a control signal based on the at least one control voltage signal from the switched capacitor integrator and the first clock switch signal; and a NAND gate configured to:

generate a switching control signal to control the second switch based on the control signal from the VCDL and an inversion signal of the first clock switch signal, trigger the second switch to turn on, based on a falling edge of the first clock switch signal, and trigger the second switch to turn off based on a current flowing through the inductor being reached zero.

8. The synchronous boost converter of claim 7, wherein the switched capacitor integrator is configured to detect the magnitude of the current by sampling a voltage drop across the bypass switch in a first phase.

9. The synchronous boost converter of claim 8, wherein the synchronous boost converter in a discontinuous conduction mode (DCM) is configured to operate in the first phase, a second phase, and a third phase, wherein the inductor is configured to be charged based on the first switch being turned on in the second phase, and wherein the inductor is configured to be discharged based on the second switch being turned on in the third phase.

10. The synchronous boost converter of claim 7, wherein the feedback-based pulse generator is configured to:

generate the second clock switch signal to be turned on the second switch based on the first clock switch signal to be turned off the first switch, and generate the second clock switch signal to be turned off the second switch based on the current flowing through the bypass switch being reached zero.

11. The synchronous boost converter of claim 7, wherein the feedback-based pulse generator further comprises:

a level shifter configured to convert a lower magnitude of the switching control signal to a higher magnitude to match with the output voltage of the output terminal of the synchronous boost converter.

* * * * *